United States Patent
Kilbride

[11] Patent Number: 5,990,456
[45] Date of Patent: Nov. 23, 1999

[54] SYRUP WARMING SYSTEM

[76] Inventor: Herbert F. Kilbride, Box 40 Virgin Gouda, British Virgin Islands, Virgin Islands (Br.)

[21] Appl. No.: 09/251,851

[22] Filed: Feb. 17, 1999

[51] Int. Cl.[6] .............................. F27D 11/02; A47J 36/24; A47J 39/02
[52] U.S. Cl. ...................... 219/432; 219/434; 222/146.5
[58] Field of Search .................................. 219/385–387, 219/214, 421, 429, 432–434; 222/146.5

[56] References Cited

U.S. PATENT DOCUMENTS

| | | | |
|---|---|---|---|
| 968,682 | 8/1910 | Parkhurst et al. | 219/434 |
| 1,028,383 | 6/1912 | Parkhurst | 219/432 |
| 1,145,977 | 7/1915 | Denhard | 219/434 |
| 1,151,605 | 8/1915 | Morgan | 219/434 |
| 2,847,552 | 8/1958 | Gates | 219/434 |
| 3,105,138 | 9/1963 | Gazdik | 219/386 |
| 3,215,817 | 11/1965 | Peek | 219/432 |
| 3,432,641 | 3/1969 | Welke | 219/433 |
| 3,514,579 | 5/1970 | Sanders | 219/430 |
| 3,591,768 | 7/1971 | Torres | 219/387 |
| 3,725,641 | 4/1973 | Tilp | 219/433 |
| 3,808,825 | 5/1974 | Ciurea | 219/386 |
| 3,896,973 | 7/1975 | Morgan | 222/146.5 |
| 3,904,086 | 9/1975 | Losenno | 222/146.5 |
| 4,145,603 | 3/1979 | Mackay et al. | 219/387 |
| 4,147,924 | 4/1979 | De Witt, Jr. | 219/417 |
| 4,158,125 | 6/1979 | Jones | 219/433 |
| 4,305,533 | 12/1981 | Wightman et al. | 224/42.42 |
| 4,853,518 | 8/1989 | Bravo | 219/441 |

*Primary Examiner*—Joseph Pelham
*Attorney, Agent, or Firm*—Joseph N. Breaux

[57] ABSTRACT

A syrup warming system for warming syrups and the like contained within a container that includes a mechanism for varying the amount of heat provided to a syrup container without varying the amount of heat supplied by a heating element. The heating element is powerable by a battery. The mechanism is a removable, adjustable height pitcher support basket including a tubular top member and a cup-shaped bottom member. The syrup warming system may include a number of interconnectable warming units that are securable together if desired.

3 Claims, 3 Drawing Sheets

SYRUP WARMING SYSTEM

TECHNICAL FIELD

The present invention relates to warming devices and more particularly to a syrup warming system for warming syrups and the like contained within a pitcher that includes a warming unit having a housing containing a battery insertion slot including positive and negative slot/battery contacts, and an electric heater element, in series connection with the positive and negative slot/battery contacts and an on/off switch, positioned beneath an insertion hole formed through a top surface of the housing; a rechargeable battery including a positive and a negative battery terminal contact positioned on the rechargeable battery such that, when the rechargeable battery is fully inserted into the battery insertion slot, the positive and negative slot/battery contacts engage and form an electrical connection with the positive and the negative battery terminal contacts of the rechargeable battery; and a removable, adjustable height pitcher support basket including a tubular top member and a cup-shaped bottom member; the tubular top member including an upper flange, a pitcher passageway and threaded exterior portion; the upper flange being sized sufficiently to disallow passage thereof through the insertion hole of the top surface of the housing; the threaded exterior portion being sized to pass through the insertion hole of the top surface of the housing; the cup-shaped bottom member including a wire mesh bottom surface and an internal threaded surface; the internal threaded surface of the cup-shaped bottom member being companionate with the threaded exterior portion of the tubular top member; the cup-shaped bottom member being threadable onto the threaded exterior portion of the tubular top member to adjust a distance between the wire mesh bottom surface of the cup-shaped bottom member and the electric heater element to control the heat applied by the electric heater element to syrups and the like contained within a pitcher supported on the wire mesh bottom surface of the cup-shaped bottom member.

BACKGROUND ART

Many diners enjoy warmed syrups and the like with foods such as pancakes and waffles. Although warmed syrups are enjoyed by many, maintaining the syrups at the desired temperature can be difficult when the syrups are maintained on the dining tables. It would be a benefit, therefore, to have a syrup warming system that included a heating element for supplying heat to a container, such as a pitcher, containing syrup or the like. Because it could be desirable to maintain syrups at different temperatures, it would be a further benefit to have a syrup warming system that included a mechanism for varying the amount of heat provided to a syrup container without varying the amount of heat supplied by the heating element. Because it could also be desirable to have a syrup warming system that could be brought to the table along with the food, it would further be desirable to have a syrup warming system that included a battery powered heating element that did not require connection with an AC power outlet to operate. Because it could be desirable to warm a number of syrups or the like contained within a number of separate containers, it would be further benefit to have a syrup warming system that included a number of interconnectable warming units that could be secured together.

GENERAL SUMMARY DISCUSSION OF INVENTION

It is thus an object of the invention to provide a syrup warming system for warming syrups and the like contained within a container.

It is a further object of the invention to provide a syrup warming system that includes a mechanism for varying the amount of heat provided to a syrup container without varying the amount of heat supplied by the heating element.

It is a still further object of the invention to provide a syrup warming system that includes a battery powered heating element.

It is a still further object of the invention to provide a syrup warming system that includes a number of interconnectable warming units that are securable together.

It is a still further object of the invention to provide a syrup warming system that includes a warming unit having a housing containing a battery insertion slot including positive and negative slot/battery contacts, and an electric heater element, in series connection with the positive and negative slot/battery contacts and an on/off switch, positioned beneath an insertion hole formed through a top surface of the housing; a rechargeable battery including a positive and a negative battery terminal contact positioned on the rechargeable battery such that, when the rechargeable battery is fully inserted into the battery insertion slot, the positive and negative slot/battery contacts engage and form an electrical connection with the positive and the negative battery terminal contacts of the rechargeable battery; and a removable, adjustable height pitcher support basket including a tubular top member and a cup-shaped bottom member; the tubular too member including an upper flange, a pitcher passageway and threaded exterior portion; the upper flange being sized sufficiently to disallow passage thereof through the insertion hole of the top surface of the housing; the threaded exterior portion being sized to pass through the insertion hole of the top surface of the housing; the cup-shaped bottom member including a wire mesh bottom surface and an internal threaded surface; the internal threaded surface of the cup-shaped bottom member being companionate with the threaded exterior portion of the tubular top member; the cup-shaped bottom member being threadable onto the threaded exterior portion of the tubular top member to adjust a distance between the wire mesh bottom surface of the cup-shaped bottom member and the electric heater element to control the heat applied a by the electric heater element to syrups and the like contained within a pitcher supported on the wire mesh bottom surface of the cup-shaped bottom member.

It is a still further object of the invention to provide a syrup warming system that accomplishes all or some of the above objects in combination.

Accordingly, a syrup warming system is provided. The syrup warming system includes a warming unit having a housing containing a battery insertion slot including positive and negative slot/battery contacts, and an electric heater element, in series connection with the positive and negative slot/battery contacts and an on/off switch, positioned beneath an insertion hole formed through a top surface of the housing; a rechargeable battery including a positive and a negative battery terminal contact positioned on the rechargeable battery such that, when the rechargeable battery is fully inserted into the battery insertion slot, the positive and negative slot/battery contacts engage and form an electrical connection with the positive and the negative battery terminal contacts of the rechargeable battery; and a removable, adjustable height pitcher support basket including a tubular top member and a cup-shaped bottom member; the tubular top member including an upper flange, a pitcher passageway and threaded exterior portion; the upper flange being sized sufficiently to disallow passage thereof through the insertion hole of the top surface of the housing; the threaded exterior portion being sized to pass through the insertion hole of the top surface of the housing; the cup-shaped bottom member including a wire mesh bottom surface and an internal threaded surface; the internal threaded surface of the cup-shaped bottom member being companionate with the threaded exterior portion of the tubular top member; the cup-shaped bottom member being threadable onto the threaded exterior portion of the tubular top member to adjust a distance between the wire mesh bottom surface of the cup-shaped bottom member and the electric heater element to control the heat applied by the electric heater element to syrups and the like contained within a pitcher supported on the wire mesh bottom surface of the cup-shaped bottom member. In preferred embodiments, the syrup warming system can also include individually and in combination an AC/DC power converter and connecting cord; a number of removable, adjustable height pitcher support baskets; a number of heating elements; and a number of identical warming units each having a housing including a locking key member and a companionately shaped keyway to allow for interconnection of the warming units.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
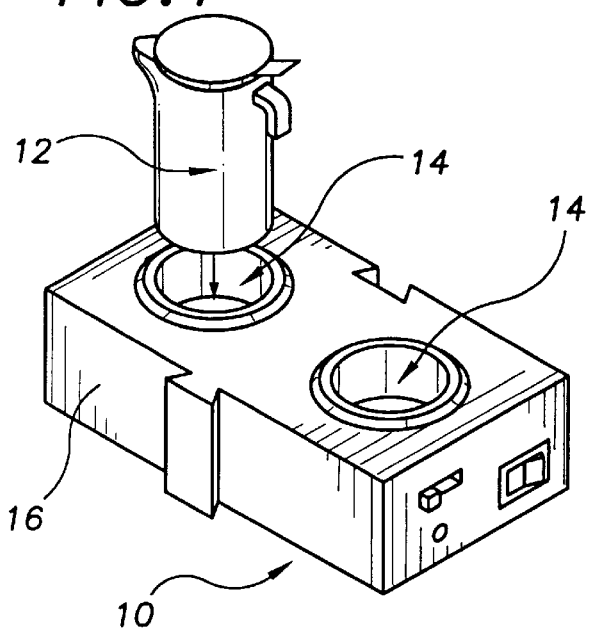
FIG. 1 is a perspective view of an exemplary embodiment of the warming unit of the syrup warming system of the present invention with a syrup pitcher positioned above one of the two identical removable, adjustable height pitcher support baskets of the warming unit.
Figure 2:
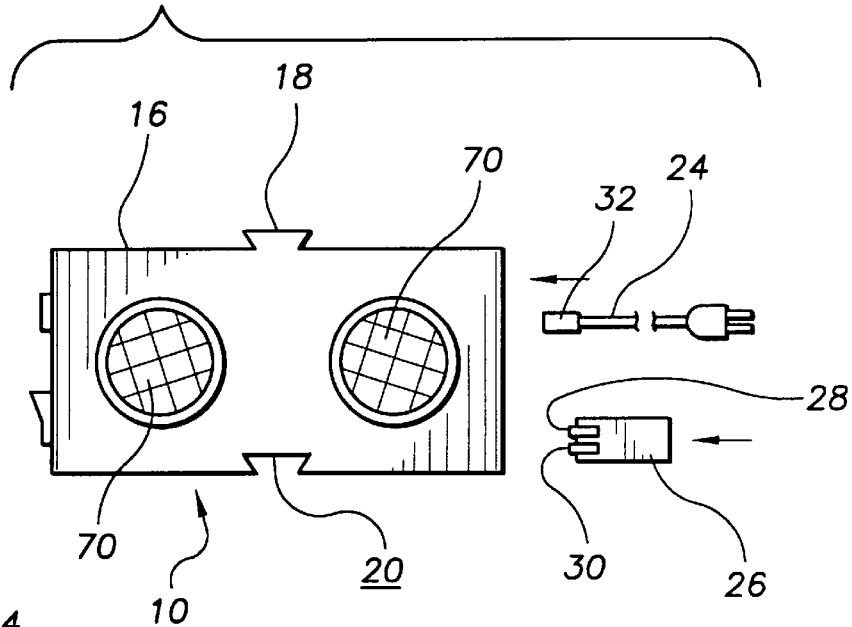
FIG. 2 is a top view of the exemplary warming unit; an exemplary AC power cord that is connectable to an internal AC/DC power adapter provided within the warming unit; and a rechargeable battery including a positive and a negative battery terminal contact.
Figure 4:
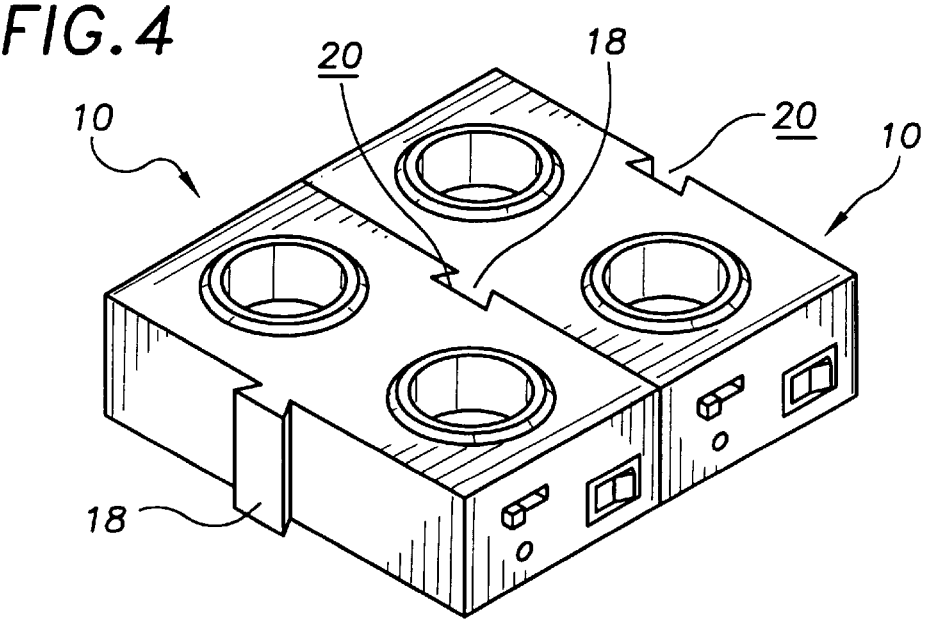
FIG. 4 is a perspective view showing two of the exemplary warming units of FIG. 1 interconnected by sliding the elongated locking key member of the first warming unit into the elongated, companionately shaped, keyway of the second warming unit.

FIG. 1 shows an exemplary warming unit, generally designated 10, of the syrup warming system of the present invention with a representative metal syrup pitcher, generally designated 12, positioned above one of two identical removable, adjustable height pitcher support baskets, generally designated 14, of warming unit 10. Warming unit 10 includes a metal housing 16, with reference now to FIG. 2, having an elongated locking key member 18 protruding from a first side thereof and an elongated, companionately shaped, keyway 20 formed into a second opposite side thereof. Referring to FIG. 4, key member 18 and keyway 20 are used to secure multiple warming units 10 together.

Figure 3:
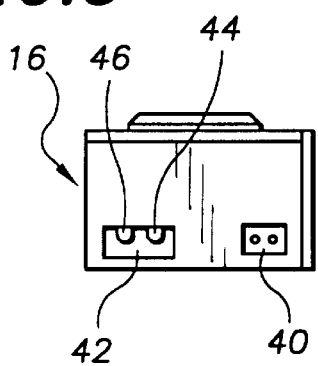
FIG. 3 is a side plan view of the left side of the warming unit showing the AC power cord jack and the rechargeable battery insertion slot including the positive and negative slot/battery contacts positioned within the battery insertion slot to engage and form an electrical connection with the positive and the negative battery terminal contacts of the rechargeable battery when the rechargeable battery is fully inserted into the battery insertion slot.

Referring back to FIG. 2, warming unit 10 includes an AC power cord 24 and a rechargeable battery 26. Rechargeable battery 26 includes a positive battery terminal contact 28 and a negative battery terminal contact 30. AC power cord 24 includes a plug 32 that, referring now to FIG. 3, is connectable to an AC/DC power converter 38 (FIG. 5) using an AC power jack 40 provided in the left sidewall of housing 16. Rechargeable battery 26 (FIG. 2) is insertable into a rechargeable battery insertion slot 42. Rechargeable battery insertion slot 42 includes a positive slot battery contact 44 and a negative slot/battery contact 46 that are positioned within battery insertion slot 42 to engage and form an electrical connection with the positive and the negative battery terminal contacts 28,30 (FIG. 2) of rechargeable battery 26 (FIG. 2) when rechargeable battery 26 (FIG. 2) is fully inserted into battery insertion slot 42.

Figure 5:
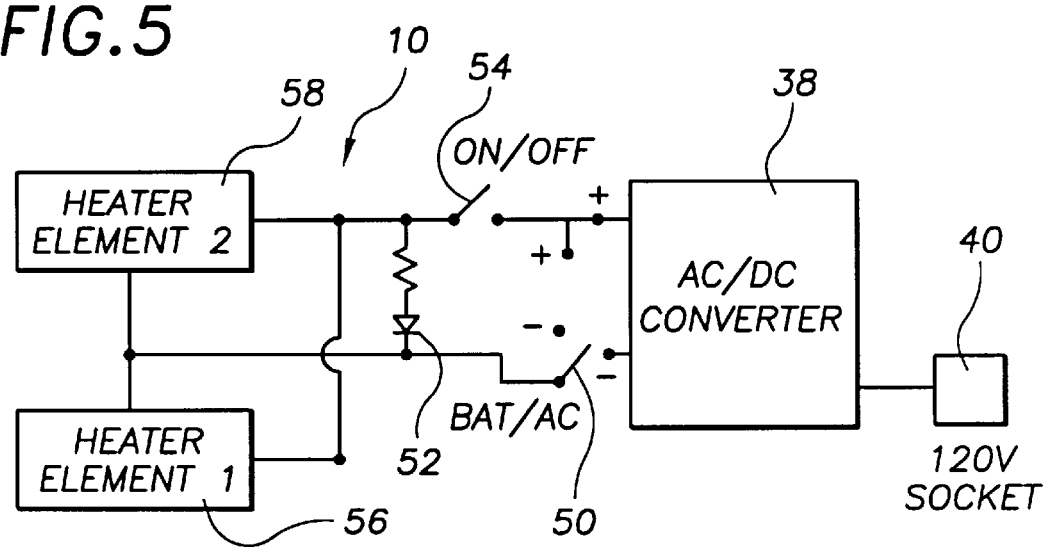
FIG. 5 is a schematic diagram of the warming unit of FIG. 1 showing the 120 Volt AC socket; the AC/DC converter; the positive and negative slot/battery contacts; the AC/Battery select switch; the power indicator diode; and the first and second electric heater elements.
Figure 6:
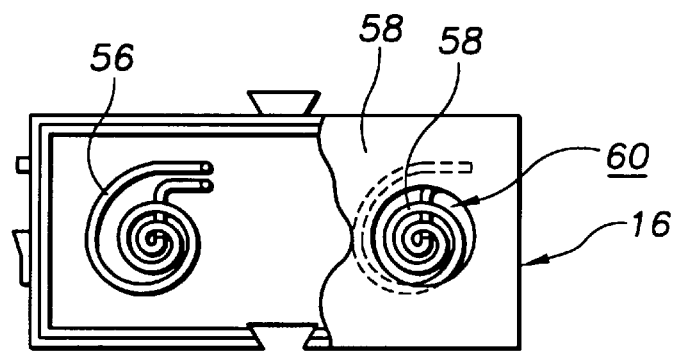
FIG. 6 is a partial cut-away view of the warming unit of FIG. 1 with a portion of the top surface of the warming unit removed to show one of the two electric heating elements in its entirety and the other electric heating element positioned beneath one of the two insertion holes of the top surface, each insertion hole provided for receiving one of the two removable adjustable height pitcher support baskets.
Figure 7:
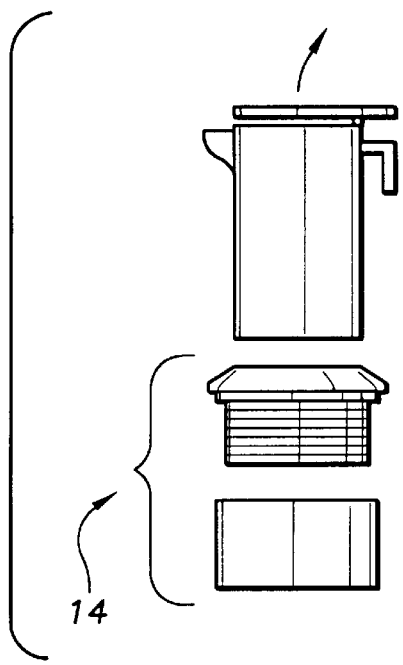
FIG. 7 is a side plan view of a representative syrup pitcher and an exemplary embodiment of the removable adjustable height pitcher support basket including the tubular top member with the threaded exterior portion exploded away from the internally, companionately threaded cup-shaped bottom member.

Referring now to FIG. 5, warming unit 10 includes 120 Volt AC socket 40; AC/DC converter 38; positive and negative slot/battery contacts 44,46; an AC/Battery select switch 50; a power indicator diode 52; an on/off switch 54; and first and second electric heater elements 56,58. Referring now to FIG. 6, in this embodiment first and second electric heater elements 56,58 are positioned within housing 16 beneath a top surface 58 that is provided with two identical insertion holes 60 each provided for receiving, with reference now to FIG. 7, one of the two identical removable adjustable height pitcher support baskets 14.

Figure 8:
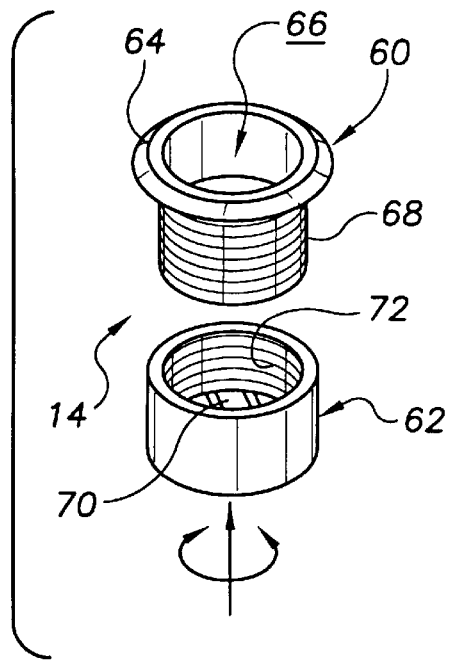
FIG. 8 is an exploded perspective view of one of the removable adjustable height pitcher support baskets showing the upper flange, the pitcher passageway and the threaded exterior portion of the tubular top member; and the wire mesh bottom surface and the internal, companionately threaded surface of the cup-shaped bottom member.

Referring now to FIG. 8, each removable adjustable height pitcher support basket 14 includes a tubular top portion, generally designated 60, and a cup-shaped bottom member, generally designated 62. Tubular top portion 60 includes an upper flange 64, a pitcher passageway 66 and a threaded exterior portion 68. The outer diameter of upper flange 64 is greater than the diameter of insertion opening 60 (FIG. 6). The outer diameter of threaded exterior portion 68 is less than the diameter of insertion opening 60 (FIG. 6). Cup-shaped bottom member 62 includes a wire mesh bottom surface 70 (see also FIG. 2) and an internal, companionately threaded surface 72.

Figure 9A:
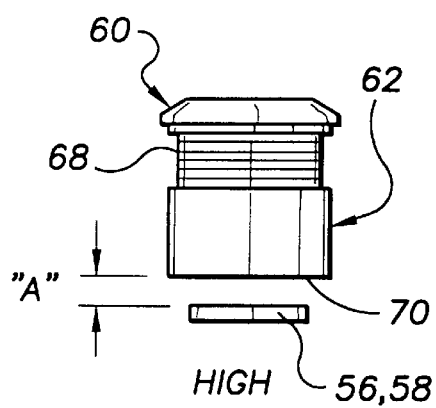
FIG. 9A is a side plan view of the removable adjustable height pitcher support basket positioned above an electric heater element showing the cup-shaped bottom member barely threaded onto the threaded exterior portion of the tubular top member to provide a high syrup heating configuration with the wire mesh bottom surface of the cup-shaped bottom member positioned a distance "A" above the electric heater element.
Figure 9B:
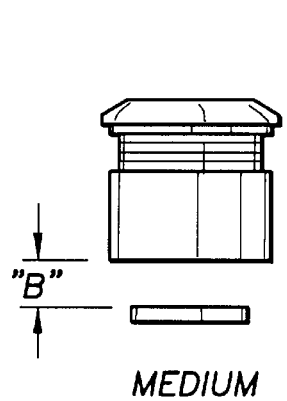
FIG. 9B is a side plan view of the removable adjustable height pitcher support basket positioned above an electric heater element showing the cup-shaped bottom member threaded half-way onto the center of the threaded exterior portion of the tubular top member to provide a medium syrup heating configuration with the wire mesh bottom surface of the cup-shaped bottom member positioned a distance "B" above the electric heater element.
Figure 9C:
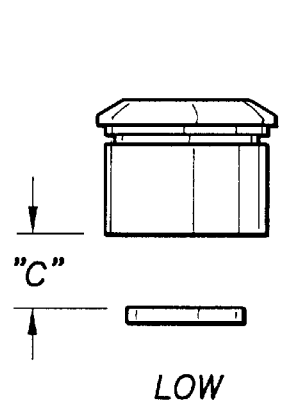
FIG. 9C is a side plan view of the removable adjustable height pitcher support basket positioned above an electric heater element showing the cup-shaped bottom member completely threaded onto the threaded exterior portion of the tubular top member to provide a low syrup heating configuration with the wire mesh bottom surface of the cup-shaped bottom member positioned a distance "C" above the electric heater element.

Referring now generally to FIGS. 9A, 9B and 9C, cup-shaped bottom member 62 is threaded onto threaded exterior portion 68 of tubular top portion 60 to achieve a variety of distances "A", "B","C", between an electric heater element 56,58 and wire mesh bottom surface 70 of cup-shaped bottom member 62. The smaller distance "A" provides greater heating to a pitcher 12 (FIG. 1) than the greater distance "C". In use the desired heating effect is set by removing removable adjustable height pitcher support basket 14 and screwing cup-shaped bottom member 62 onto or off of tubular top member 60 to achieve the desired distance "A","B","C" or other user set distance.

It can be seen from the preceding description that a syrup warming system has been provided that includes a mechanism for varying the amount of heat provided to a syrup container without varying the amount of heat supplied by a heating element; that includes a battery powered heating element; that includes a number of interconnectable warming units that are securable together; and that includes a warming unit having a housing containing a battery insertion slot including positive and negative slot/battery contacts, and an electric heater element, in series connection with the positive and negative slot/battery contacts and an on/off switch, positioned beneath an insertion hole formed through a top surface of the housing; a rechargeable battery including a positive and a negative battery terminal contact positioned on the rechargeable battery such that, when the rechargeable battery is fully inserted into the battery insertion slot, the positive and negative slot/battery contacts engage and form an electrical connection with the positive and the negative battery terminal contacts of the rechargeable battery; and a removable, adjustable eight pitcher support basket including a tubular top member and a cup-shaped bottom member; the tubular top member including an upper flange, a pitcher passageway and threaded exterior portion; the upper flange being sized sufficiently to disallow passage thereof through the insertion hole of the top surface of the housing; the threaded exterior portion being sized to pass through the insertion hole of the top surface of the housing; the cup-shaped bottom member including a wire mesh bottom surface and an internal threaded surface; the internal threaded surface of the cup-shaped bottom member being companionate with the threaded exterior portion of the tubular top member; the cup-shaped bottom member being threadable onto the threaded exterior portion of the tubular top member to adjust a distance between the wire mesh bottom surface of the cup-shaped bottom member and the electric heater element to control the heat applied by the electric heater element to syrups and the like contained within a pitcher supported on the wire mesh bottom surface of the cup-shaped bottom member.

It is noted that the embodiment of the syrup warming system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A syrup warming system comprising:

a warming unit having a housing containing a battery insertion slot including positive and negative slot/battery contacts, and an electric heater element, in series connection with said positive and negative slot/battery contacts and an on/off switch, positioned beneath an insertion hole formed through a top surface of said housing;

a rechargeable battery including a positive and a negative battery terminal contact positioned on said rechargeable battery such that, when said rechargeable battery is fully inserted into said battery insertion slot, said positive and negative slot/battery contacts engage and form an electrical connection with said positive and said negative battery terminal contacts of said rechargeable battery; and a removable, adjustable height pitcher support basket including a tubular top member and a cup-shaped bottom member;

said tubular top member including an upper flange, a pitcher passageway and threaded exterior portion;

said upper flange being sized sufficiently to disallow passage thereof through said insertion hole of said top surface of said housing;

said threaded exterior portion being sized to pass through said insertion hole of said top surface of said housing;

said cup-shaped bottom member including a wire mesh bottom surface and an internal threaded surface;

said internal threaded surface of said cup-shaped bottom member being companionate with said threaded exterior portion of said tubular top member;

said cup-shaped bottom member being threadable onto said threaded exterior portion of said tubular top member to adjust a distance between said wire mesh bottom surface of said cup-shaped bottom member and said electric heater element to control said heat applied by said electric heater element to syrups and said like contained within a pitcher supported on said wire mesh bottom surface of said cup-shaped bottom member.

2. The syrup warming system of claim 1 further comprising:

an AC/DC power converter having a positive and a negative output switchable into electrical connection with said electrical heater element.

3. The syrup warming system of claim 1 wherein said syrup warming system includes a number of warming units each having a locking key member and a companionately shaped keyway provided on said housing thereof.

* * * * *